United States Patent
Hortop et al.

(10) Patent No.: US 11,263,787 B2
(45) Date of Patent: Mar. 1, 2022

(54) AUGMENTED REALITY DETECTION FOR LOCATING AUTONOMOUS VEHICLES

(71) Applicant: Rivian IP Holdings, LLC, Plymouth, MI (US)

(72) Inventors: Matthew Hortop, Ann Arbor, MI (US); Patrick Hunt, Evanston, IL (US); Lacey Trelfa, Aliso Viejo, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 0 days.

(21) Appl. No.: 16/810,652

(22) Filed: Mar. 5, 2020

(65) Prior Publication Data

US 2021/0279913 A1 Sep. 9, 2021

(51) Int. Cl.
  *G06T 11/00* (2006.01)
  *G06K 9/00* (2006.01)
  *H04N 5/232* (2006.01)

(52) U.S. Cl.
  CPC .......... *G06T 11/00* (2013.01); *G06K 9/00671* (2013.01); *H04N 5/23222* (2013.01); *G06K 2209/23* (2013.01)

(58) Field of Classification Search
  None
  See application file for complete search history.

(56) References Cited

U.S. PATENT DOCUMENTS

| | | | |
|---|---|---|---|
| 9,841,814 B1 * | 12/2017 | Kallmeyer | G06F 3/167 |
| 9,898,863 B2 * | 2/2018 | Miyazaya | H04R 5/033 |
| 10,318,811 B1 * | 6/2019 | Gold | G06T 19/006 |
| 10,726,631 B1 * | 7/2020 | Ha | G06K 9/00671 |
| 10,802,582 B1 * | 10/2020 | Clements | G06F 3/04817 |
| 10,809,081 B1 * | 10/2020 | Kentley-Klay | G08G 1/017 |
| 2007/0162942 A1 * | 7/2007 | Hamynen | H04N 21/6125 725/105 |
| 2012/0176410 A1 * | 7/2012 | Meier | G06F 3/011 345/633 |
| 2013/0010103 A1 * | 1/2013 | Ihara | B63B 43/18 348/116 |

(Continued)

OTHER PUBLICATIONS iDB, "Find Your Missing Items in Augmented Reality with Pixie", Sep. 6, 2017, YouTube.com, URL: https://www.youtube.com/watch?v=mLv3YVLOS9k&t=210s (Year: 2017).*

*Primary Examiner* — David H Chu
(74) *Attorney, Agent, or Firm* — Clements Bernard Baratta; Christopher L. Bernard (57) ABSTRACT

Disclosed embodiments include methods, systems, and non-transitory computer readable medium for augmented reality detection for locating a particular autonomous vehicle. In a non-limiting embodiment, an illustrative method includes providing, by an electronic device to a remote server, a request for an autonomous vehicle. A first signal indicating that the autonomous vehicle is within an accessible range to an intended passenger is received by an electronic device. The passenger is prompted by the electronic device to orient an image sensor of the electronic device towards a designated area of the accessible range. The designated area is imaged by the image sensor for the autonomous vehicle. A visual representation of the imaged designated area is generated on a graphical user interface of the electronic device. The autonomous vehicle is identified within the generated visual representation.

18 Claims, 5 Drawing Sheets

(56) References Cited

U.S. PATENT DOCUMENTS

| | | | | |
|---|---|---|---|---|
| 2014/0180972 A1* | 6/2014 | Boldyrev | ............... | G06N 20/00 |
| | | | | 706/12 |
| 2014/0240350 A1* | 8/2014 | Chen | ...................... | G06F 3/011 |
| | | | | 345/633 |
| 2014/0267400 A1* | 9/2014 | Mabbutt | ................. | G06F 1/163 |
| | | | | 345/633 |
| 2015/0091941 A1* | 4/2015 | Das | ......................... | G06F 3/017 |
| | | | | 345/633 |
| 2016/0055676 A1* | 2/2016 | Kasahara | .............. | G06T 19/006 |
| | | | | 345/633 |
| 2016/0140868 A1* | 5/2016 | Lovett | ................... | G06T 19/006 |
| | | | | 434/118 |
| 2016/0358383 A1* | 12/2016 | Gauglitz | ............... | G06T 19/006 |
| 2017/0365101 A1* | 12/2017 | Samec | ..................... | A61B 3/09 |
| 2018/0005446 A1* | 1/2018 | Elazary | ..................... | G06T 7/20 |
| 2019/0073111 A1* | 3/2019 | Luchner | ................ | G06F 3/0304 |
| 2019/0248245 A1* | 8/2019 | Golgiri | .................. | B60L 53/60 |
| 2019/0268169 A1* | 8/2019 | Castillo | ................. | H04L 9/0861 |
| 2019/0294841 A1* | 9/2019 | Hall | .................... | G06K 7/10722 |
| 2019/0378400 A1* | 12/2019 | Lisaj | ...................... | G08B 25/10 |
| 2020/0264007 A1* | 8/2020 | Yoo | ..................... | G06K 9/00671 |
| 2020/0309558 A1* | 10/2020 | Cowburn | ........... | G06Q 30/0259 |
| 2021/0374407 A1 | 12/2021 | O'Connell et al. | | |

\* cited by examiner

AUGMENTED REALITY DETECTION FOR LOCATING AUTONOMOUS VEHICLES

TECHNICAL FIELD

The present disclosure relates to autonomous vehicles.

BACKGROUND

The statements in this section merely provide background information related to the present disclosure and may not constitute prior art.

Autonomous vehicles are of great interest for transportation applications and can provide benefits to the ride-sharing industry. Conventionally, when an intended passenger makes a request for a ride-sharing vehicle, the intended passenger may have to contact the driver or have human interactions with the driver of the vehicle to identify his/her particular vehicle, especially when in a crowded area such as a city or an airport. Such interaction, however, may be challenging, if even possible, when attempting to locate an autonomous vehicle within a pool of autonomous vehicles or a crowded area with obstructions.

SUMMARY

Disclosed embodiments include methods, systems, and non-transitory computer readable medium for augmented reality detection for locating a particular autonomous vehicle.

In a non-limiting embodiment, an illustrative method includes providing, by an electronic device to a remote server, a request for an autonomous vehicle. A first signal indicating that the autonomous vehicle is within an accessible range to an intended passenger is received by an electronic device. The passenger is prompted by the electronic device to orient an image sensor of the electronic device towards a designated area of the accessible range. The designated area is imaged by the image sensor for the autonomous vehicle. A visual representation of the imaged designated area is generated on a graphical user interface of the electronic device. The autonomous vehicle is identified within the generated visual representation.

In another non-limiting embodiment, an illustrative system includes a computer processing system and a computer memory. The computer processing system is configured to execute steps including: providing, by an electronic device to a remote server, a request for an autonomous vehicle; receiving, by the electronic device, a first signal indicating that the autonomous vehicle is within an accessible range to an intended passenger; prompting, by the electronic device, the passenger to orient an image sensor of the electronic device towards a designated area of the accessible range; imaging, by the image sensor, the designated area for the autonomous vehicle; generating, by the electronic device, a visual representation of the imaged designated area on a graphical user interface of the electronic device; and identifying, by the electronic device, the autonomous vehicle within the generated visual representation.

In another non-limiting embodiment, non-transitory computer readable medium includes program instructions for locating autonomous vehicles. The program instructions when executed cause a computer processing system to execute steps including: providing, by an electronic device to a remote server, a request for an autonomous vehicle; receiving, by the electronic device, a first signal indicating that the autonomous vehicle is within an accessible range to an intended passenger; prompting, by the electronic device, the passenger to orient an image sensor of the electronic device towards a designated area of the accessible range; imaging, by the image sensor, the designated area for the autonomous vehicle; generating, by the electronic device, a visual representation of the imaged designated area on a graphical user interface of the electronic device; and identifying, by the electronic device, the autonomous vehicle within the generated visual representation.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE FIGURES

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

Like reference symbols in the various drawings generally indicate like elements.

DETAILED DESCRIPTION

The following description is merely illustrative in nature and is not intended to limit the present disclosure, application, or uses. It will be noted that the first digit of three-digit reference numbers and the first two digits of four-digit reference numbers correspond to the first digit of one-digit figure numbers and the first two digits of two-digit figure numbers, respectively, in which the element first appears.

Figure 1:
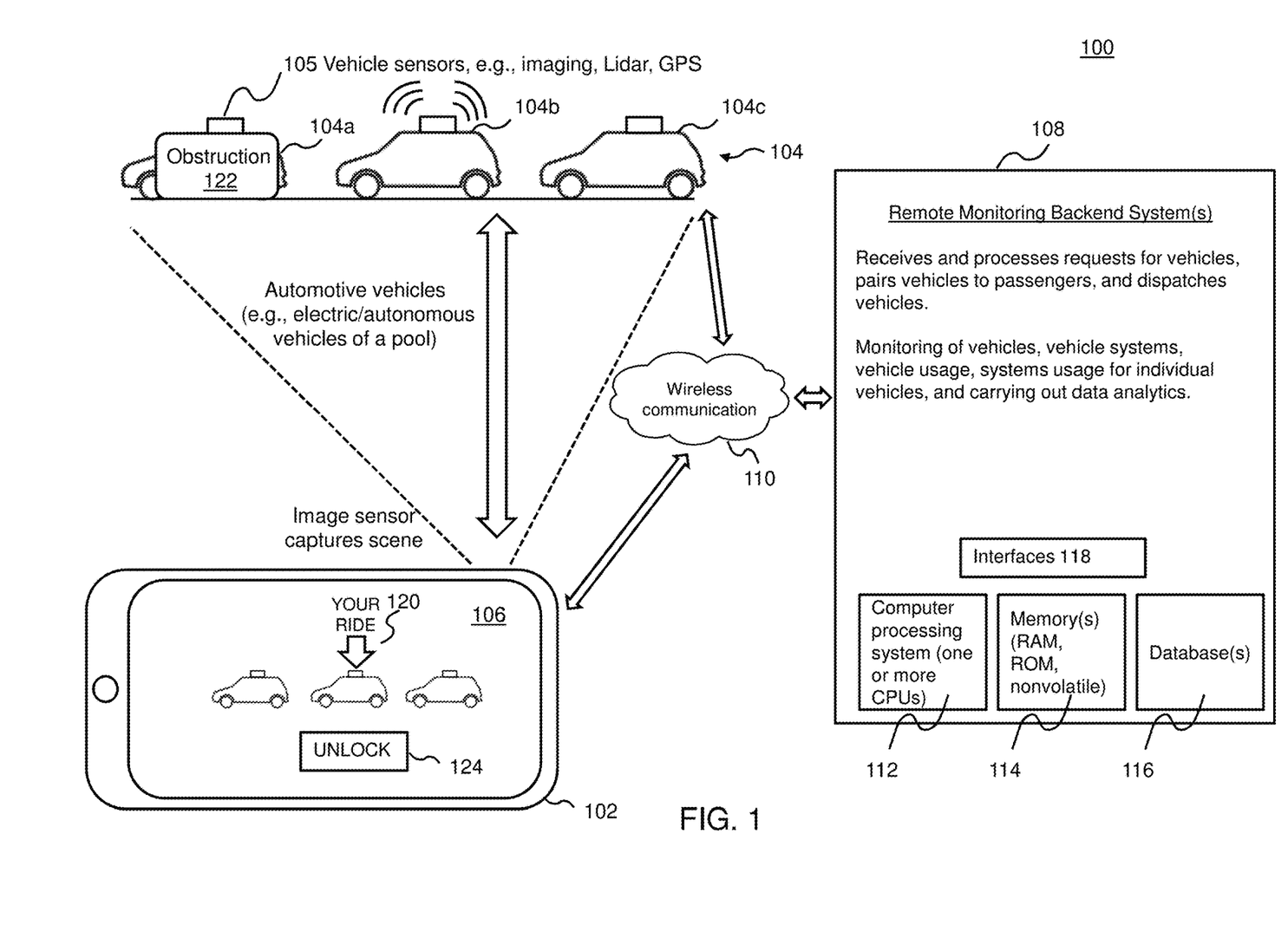
FIG. 1 is a block diagram in partial schematic form of an illustrative framework for an approach of augmented reality detection for locating a particular autonomous vehicle.

FIG. 1 illustrates an illustrative framework 100 for an approach of augmented reality detection for locating a particular autonomous vehicle according to an example of the disclosure. A passenger may utilize a suitable application installed on an electronic device 102 to request an autonomous vehicle, e.g., from a pool of autonomous vehicles and then use the application on the electronic device 102 to select the proper intended autonomous vehicle from a group of nearby vehicles 104. An autonomous vehicle can be configured with an array of sensors 105, including, e.g., LIDAR (light detection and ranging), camera systems for acquiring real-time video imagery of obstacles and other vehicles, and GPS (global positioning system). An autonomous vehicle can also be configured with wireless communication systems for sending and receiving communications regarding road information and traffic in real-time, as well as a computer for applying driving rules and making driving decisions based on data and information acquired from the foregoing, in a suitable manner such as conventionally known in the art. Interaction between the passenger and the electronic device 102 may occur via a graphical user interface 106 of the electronic device 102. Electronic device 102 may transmit the request to one or more remote monitoring backend system(s) 108 via wireless and/or wire communication network 110 such as the Internet. Remote monitoring backend system(s) 108 may select a particular autonomous vehicle, e.g., from a pool of autonomous vehicles based on one or more criteria which may include, but are not limited to, distance to the intended passenger's pick-up location, amount of time it would take to arrive at the intended passenger's pick-up location, destination of the intended passenger, and/or desired vehicle accommodations of the intended passenger. Remote monitoring backend system(s) 108 may provide the request to the selected autonomous vehicle via wireless and/or wired communication network 110. Remote monitoring backend system(s) 108 may also communicate with on-board computers of the pool of autonomous vehicles 104 to control various aspects of vehicle features, as will be described further herein.

Remote monitoring backend system(s) 108 may include a computer processing system 108, which may include one or more computer processing units (CPUs) 112 located in one or more computer systems, and one or more memories 114, which may include RAM, ROM, and any suitable nonvolatile memory. Remote monitoring backend system(s) 108 may also include one or more databases 116 to store data for both vehicles and drivers, as will be explained further herein, and one or more interfaces 118 to facilitate communication via networks including the Internet and for facilitating input/output of data. Remote monitoring backend system(s) 108 carries out monitoring of vehicles, vehicle systems, vehicle usage, and systems usage for individual vehicles and for individual drivers who use those vehicles, and carries out data analytics on the data gathered from the vehicles and the vehicle systems. In examples, the pool of autonomous vehicles may include various detectors and sensors for monitoring vehicle dynamics, usage, and demand placed on vehicle systems during the driving of the pool of autonomous vehicles. For example, the autonomous vehicles may include GPS units for monitoring location, speed, and direction, battery monitoring sensors in the form of electrical circuits, for monitoring battery usage, battery discharge as a function of time, and battery charging rates, and other suitable sensors for monitoring the health and status of other major subsystems of the vehicle, such as removable modules, and for detecting warning or fault conditions. Such data may be stored in an onboard computer system with suitable memory and may be uploaded to the remote monitoring backend system(s) 108 through wireless and/or wired communication network 110 via a vehicle onboard wireless transceiver and/or via wired communication.

Each autonomous vehicle of the pool of autonomous vehicles can emit one or more location signals. For example, the one or more location signals of each autonomous vehicle may include rapidly pulsing exterior vehicle lights at a specified frequency or in a specified pattern intended for detection. The pulses, while of the visible light spectrum, may be pulsating at a frequency too high to be visually perceived as pulsating or flickering by the passenger. The one or more location signals of each autonomous vehicle may also be pulses of nonvisible spectrum light, such as laser light emitted from a LIDAR device affixed to the autonomous vehicle. The one or more location signals of each autonomous vehicle may be made up of a spectrum shift of light colors, e.g., a pulsed pattern involving different wavelengths. Communication using Wi-Fi and/or Bluetooth signals may also be used for communicating additional identification information of the intended one of the vehicles 104 between such vehicle and the electronic device 102, e.g., via text messaging or other suitable messaging. Electronic device 102 can detect the one or more location signals of the autonomous vehicle once it is in an accessible range of the autonomous vehicle. The intended passenger can be prompted, via a visual instruction displayed at graphical user interface 106 or via an audio instruction, or both, to orient an image sensor (not shown in FIG. 1) of the electronic device 102 toward a designated area once the autonomous vehicle is within an accessible range. After the passenger orients the image sensor to the designated area, the image sensor of electronic device 102 may capture a scene of the pool of autonomous vehicles 104, as will be described further herein. A visual representation of the imaged area may be generated by electronic device 102 using one or more internal processing components. The visual representation of the imaged area may be displayed on graphical user interface 106 with the autonomous vehicle identified to the passenger via one or more indications 120, as will be described further herein. In some cases, the autonomous vehicle may be partially obstructed by one or more obstructions 122 and can still be identified to the intended passenger. Access to the autonomous vehicle may be provided to the intended passenger via an access button (field) 122 on graphical user interface 106, e.g., an unlock graphic field on the touch-sensitive display screen displaying graphical user interface 106 that the intended passenger may press.

Figures 2A, 2B:
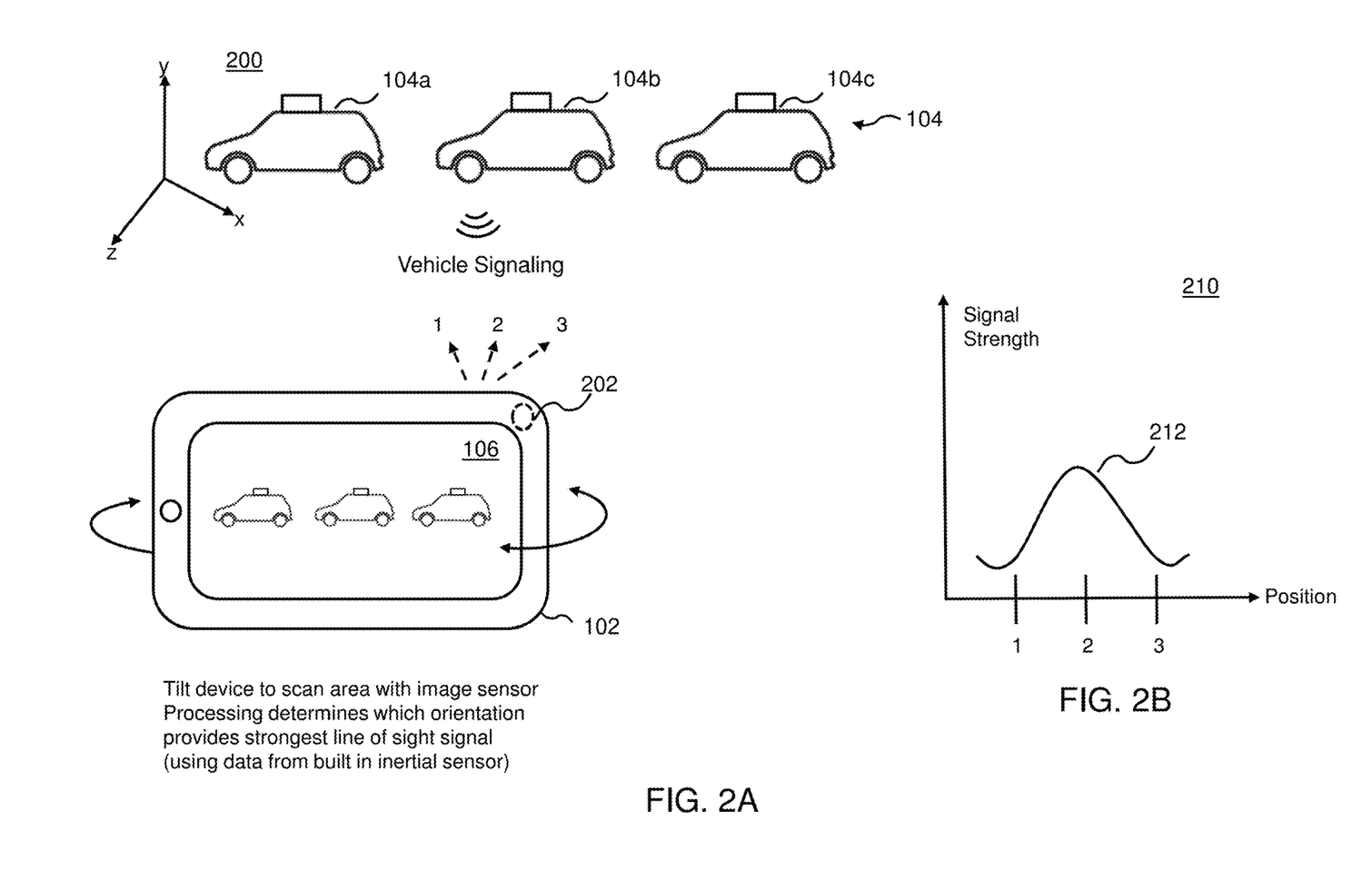
FIG. 2A is a block diagram in partial schematic form of a partial top view of an illustrative framework for an approach of augmented reality detection for locating a particular autonomous vehicle.
FIG. 2B is a graph of signal strength of detected location signals as a function of image sensor direction of an electronic device for locating a particular autonomous vehicle.

FIG. 2A illustrates a block diagram of a partial top view 200 of an illustrative framework for an approach of augmented reality detection for locating a particular autonomous vehicle according to an example of the disclosure. Electronic device 102 may include an image sensor 202. The image sensor 202 may be sensitive to visible light, nonvisible light (e.g., infrared light), or both. The image sensor 202 may be a conventional image sensor of the type typically found in smart phones. In an example, a user, having already communicated a request for a vehicle using the app running on the electronic device 102, may be alerted by the electronic device 102 that an intended vehicle is with detectable range of the user and may direct the use via a visual instruction, an audio instruction, or both, to point the electronic device toward a field of view encompassing one or more vehicles and to scan the image sensor of the electronic device 102 across the field of view by tilting the electronic device 102 laterally as illustrated in FIG. 2A.

Electronic device 102 may be tilted in one or more axes of a three-dimensional system, e.g., x,y,z-system as illustrated in FIG. 2A. Tilting of electronic device 102 allows image sensor 202 to capture images of the designated area with different orientations whereby different vehicles in the field of view are aligned with different lines of sight (e.g., dotted lines 1, 2 and 3). For example, electronic device 102 may be tilted slightly back and forth to scan and capture the signal strength of the one or more location signals. The one or more location signals can be recorded as a function of orientation of the electronic device, e.g., the vector direction of the image sensor 202 of the electronic device 102 and the orientation with the highest line of sight signal strength may be the one that points to the intended autonomous vehicle. That information can then be correlated to the captured image associated with the various orientations to flag the intended autonomous vehicle using an indicator 120, as will be described further herein.

Processing of the image information by electronic device 102 may determine an orientation of electronic device 102 which provides a strongest line of sight signal to capture an image of the pool of autonomous vehicles. For example, electronic device 102 may have an internal inertial sensor that provides data to a processor of the electronic device 102. As noted above, the electronic device 102 may prompt the user to slowly scan the image sensor 202 across a field of view containing several vehicles, may evaluate the signal strength of detected location signals as a function of orientation based on correlated inertial data simultaneously captured by the electronic device, and then identify which location in the captured imagery corresponds to the greatest signal strength of the detected location signals, and then display on the electronic device that location superimposed with the imagery of the scene so as to identify to the user the intended autonomous vehicle. In another example, the electronic device 102 may prompt a passenger, via graphical user interface 106, to modify the orientation of the electronic device 102 to different orientations to facilitate gathering data for identification of the autonomous vehicle intended for the passenger within view of the image sensor 202. Although the image sensor 202 of the electronic device 102 is exposed to conventional image signals during this process, the computer processor of the electronic device 102 is configured to discriminate the detected location signals from the background of conventional imagery signals and to evaluate which orientation (line of sight) of the image sensor of the electronic device 102 correlates to the greatest intensity of the detected location signals.

In this regard, existing image sensors typically found in smart-phone cameras may be used to capture the location signals. Such smart-phone cameras can detect pulsating light at rates faster than rates the human eye can detect. For example, smart-phone cameras can detect pulsating light at rates lower than or greater than 1,000 frames per second, such as 300 frames per second, 600 frames per second, up to 1,000 frames per second or more. Electronic device 102 can additionally include suitable filters such as one or more infrared (IR) filters or other color filters. The filter(s) may be supported by an actuator to permit movement of the filters relative to the image sensor 202. The filter(s) may be applied to improve image quality captured by image sensor 202, tune image quality captured by image sensor 202, and/or select one or more desired wavelengths for selection of location signals of specified wavelengths for capture by the image sensor 202 and processing at the electronic device 102. When the location signals are within an infrared light spectrum, for example, the electronic device 102 may remove an infrared filter from the light path for image sensor 202, using for an example, an actuator internally coupled to and controlled by a processor of electronic device 102. When the location signals comprise specified color wavelengths, e.g., a progression of signal pulses of one or more wavelengths, e.g., in sequence, the electronic device may insert such filters, e.g., in sequence, into the light path of the image sensor 202.

FIG. 2B illustrates a plot 210 of position versus signal strength for tilting of an electronic device for locating a particular autonomous vehicle according to an example of the disclosure. For illustration purposes, plot line 212 illustrates an example curve of signal strength of the detected location signals relative to position. In an example, directional lines 1, 2, 3 of FIG. 2A correlate to positions 1, 2, 3 of plot 210 illustrated in FIG. 2B associated with tilting of the electronic device 102. When electronic device 102 is oriented such that the image sensor 202 follows a line of sight along directional line 1 toward vehicle 104a of FIG. 2A, a corresponding line of sight signal strength will be minimal as image sensor 202 is not pointing directly at the center autonomous vehicle 104b, which is the vehicle emitting the location signals from among the group 104 of nearby autonomous vehicles. Similarly, when electronic device 102 is oriented such that the image sensor 202 follows a line of sight along directional line 3 toward vehicle 104c, a corresponding line of sight signal strength will be minimal as image sensor 202 is not pointing directly at the center autonomous vehicle 104b emitting the location signals. In an example, the passenger may be prompted by a spoken or graphical message at the electronic device 102 to point the image sensor of electronic device 102 in different directions to facilitate determination of a stronger line of sight signal strength of detected location signals. The stronger line of sight signal in the example of FIG. 2A, follows along directional line 2 toward vehicle 104b. Orienting electronic device 102 to have image sensor 202 pointing toward directional line 2 points image sensor 202 at the autonomous vehicle 104b intended to be paired with the intended passenger by remote monitoring backend system(s) 106. As illustrated by plot line 212 of FIG. 2B, the line of sight signal strength following direction line 2 peaks as a result of image sensor being directly oriented to view the center most autonomous vehicle 104b, in this example. In order to generate plot line 212, the application running on electronic device 102 can capture the signal strength of the location signals via the image sensor and can integrate that signal strength within suitable time intervals. For example, image sensor 202 can capture radiation, which includes the location signal, as a function of time, and the processing system of electronic device 102 can record that signal as a function of time and simultaneously record the orientation of electronic device 102 as a function of time. As noted previously, the location signal can be of a specified pulse pattern, wavelength pattern, or both, for example, and the processing system of the electronic device can analyze the captured radiation to detect the expected signal pattern, e.g., through use of cross-correlation, for instance, that involves mathematical comparison of the detected radiation with the functional form of the expected signal, or using other mathematical pattern detection techniques known to those of skill in the art. With the timing of the location signal having been detected, that detection can be correlated to the orientation that was recorded as a function of time to select the orientation that corresponds to the strongest amplitude of signal detection. The signal strength of the detected signal could also be directly correlated with the orientation during the scanning process. That correlation can then be used to overlay a graphic at the proper location on the field of view of the interface 106 of the display screen that corresponds to the vehicle, e.g., 104b, aligned as the proper source of the expected location signal, such as described in further detail in connection with FIGS. 4A-4D.

In another example, the application running on electronic device 102 can detect the intensity of the location signal (e.g., plot line 212) through use of signals collected under the control of one or more suitable wavelength filters controllably placed into the path of light impinging on the image sensor 202 so as to permit the capture desired wavelengths that make up the location signal as a function of time while the orientation of the electronic device 102 is simultaneously captured as a function of time. In this approach, for example, an image of the field of view may be captured under normal imaging, and the application running on electronic device 102 may instruct the user to scan the field of view after actuating one or more desired color filters into the field of view to record the signal strength of one or more given wavelengths as a function of time while the orientation of the electronic device 102 is also recorded as a function in order to correlate the signal strength with orientation of the electronic device 102. The signal strength of the detected signal could also be directly correlated with the orientation during the scanning process. That correlation can then be used by the processing system of the electronic device 102 to overlay a graphic at the proper location on the field of view of the interface 106 of the display screen that corresponds to the vehicle aligned as the proper source of the expected location signal, e.g., vehicle 104b, such as described in further detail in connection with FIGS. 4A-4D.

Figure 3:
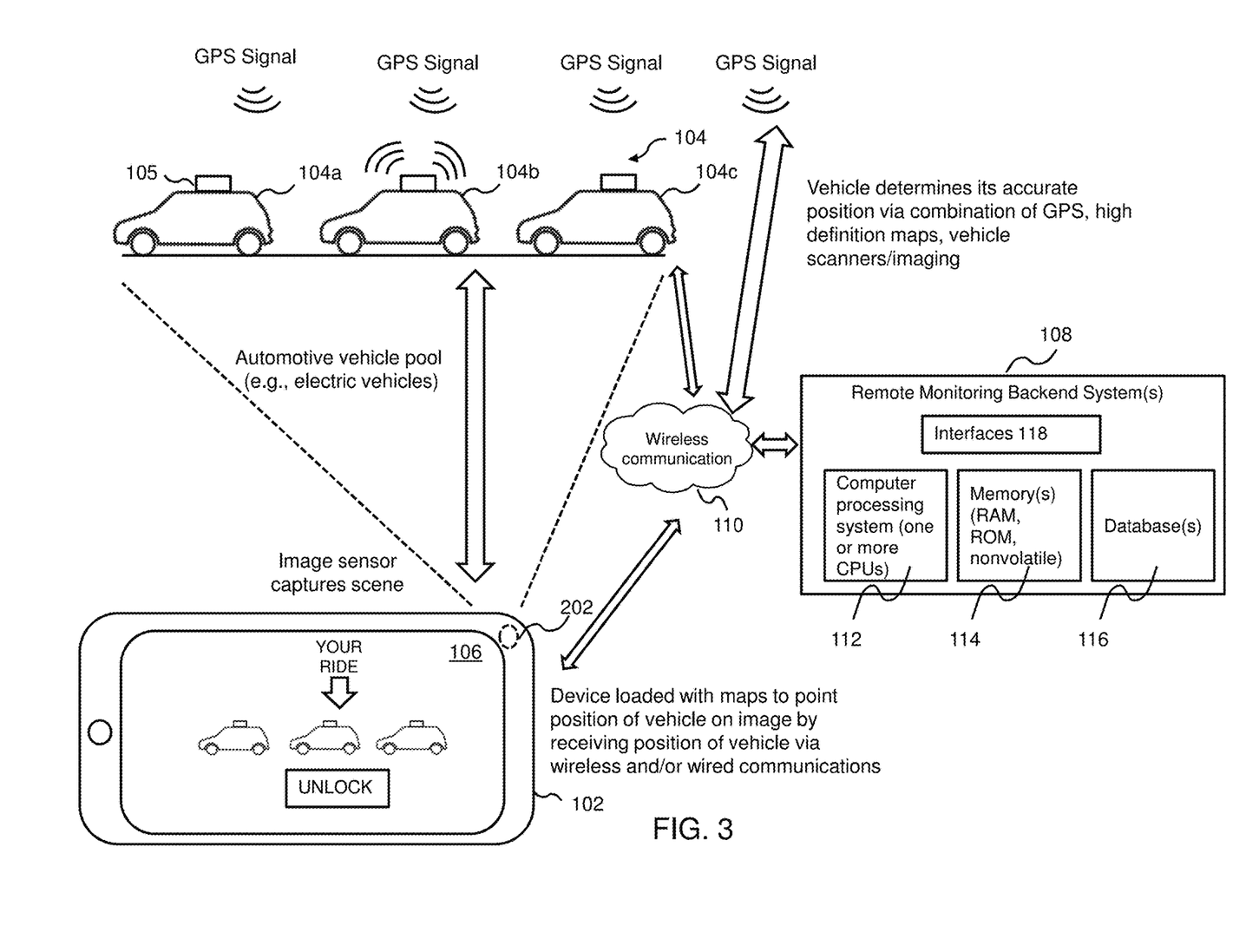
FIG. 3 is a block diagram in partial schematic form of another illustrative framework for an approach of augmented reality detection for locating a particular autonomous vehicle.

FIG. 3 illustrates an illustrative framework 300 for an approach of augmented reality detection for locating a particular autonomous vehicle according to another example of the disclosure. This example is similar to the example of FIG. 1, except that in the example of FIG. 3, accurate position information for both the autonomous vehicle and the user based at least upon, e.g., global positioning system (GPS) data and map information, provides the primary data on which identification of the intended autonomous vehicle is based. For example, the autonomous vehicle 104b determines its own position accurately, e.g., within about 1 meter or less, based on one or more of GPS data, high definition maps loaded on the autonomous vehicle, and LIDAR attached to the autonomous vehicle. Conventional approaches known in the art for identifying accurate positions of autonomous vehicles utilizing GPS data, high definition maps loaded on the autonomous vehicle, and LIDAR attached to the autonomous vehicle may be utilized in this regard. Similarly, the position of the electronic device 102 of the user is likewise determined accurately, e.g., to within about 1 meter or less, using GPS data and high definition map information accessed by the electronic device 102, e.g., using conventional approaches known to those of skill in the art. Moreover, the electronic device 102 may determine its absolute orientation with a combination of inertial sensor data and compass technology as conventionally known. With this information, as explained below, the electronic device can prompt a user via a visual instruction, audio instruction, or both, to point the electronic device toward a pinpoint location that identifies the intended autonomous vehicle. In other respects, FIG. 3 is similar to FIG. 1, and the prior discussion relating to FIGS. 1-2 is equally applicable to the example of FIG. 3. Thus, where applicable, the same reference numerals as in FIG. 1 have been retained for FIG. 3.

As shown in FIG. 3, similar to FIG. 1, a passenger may utilize a suitable application installed on an electronic device 102 to request an autonomous vehicle from a pool of autonomous vehicles. Interaction between the passenger and the electronic device 102 may occur via a graphical user interface 106 of the electronic device 102. Electronic device 102 may transmit the request to one or more remote monitoring backend system(s) 108 via wireless and/or wire communication network 110 such as the Internet. Remote monitoring backend system(s) 108 is like that described for FIG. 1.

When the autonomous vehicle 104b has arrived within a desired proximity of the location of the intended passenger, the passenger can be alerted to that fact via a wireless communication to the electronic device 102, e.g., from either the autonomous vehicle itself or from the backend system 108. A passenger can then be prompted by either a visual instruction, audio instruction, or both, at the electronic device 102 to point the electronic device 102 having image sensor 202 toward a designated area where the autonomous vehicle is located. For instance, the location and orientation of the electronic device can be communicated to the backend system 108 or the autonomous vehicle 104b, and either of those systems can instruct the user to reorient the electronic device 102 to either the left or the right until the proper line of sight orientation with the pinpoint location of the autonomous vehicle 104b is achieved. Additionally, electronic device 102 may have functionality such that when it receives the pinpoint location of the intended vehicle via wireless and/or wired communication network 110, the pinpoint location is correlated to the captured image displayed to the passenger on the graphical user interface 106 of electronic device 102. With the intended autonomous vehicle correlation to the image on graphical user interface 106, the autonomous vehicle may be identified to the passenger via an indication, as will be described further herein.

Figure 4A:
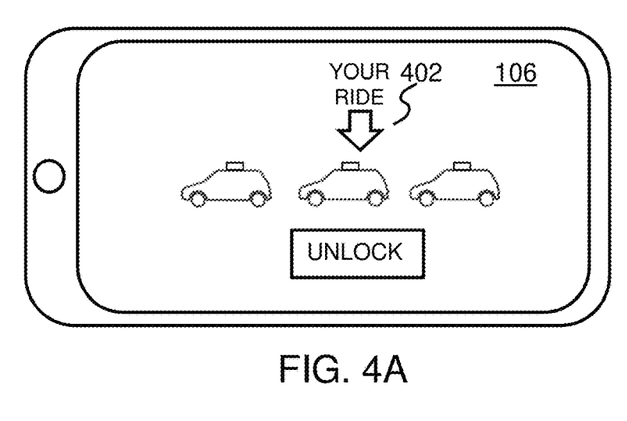
FIGS. 4A-4D are top views of illustrative identifications of an autonomous vehicle.
Figure 4B:
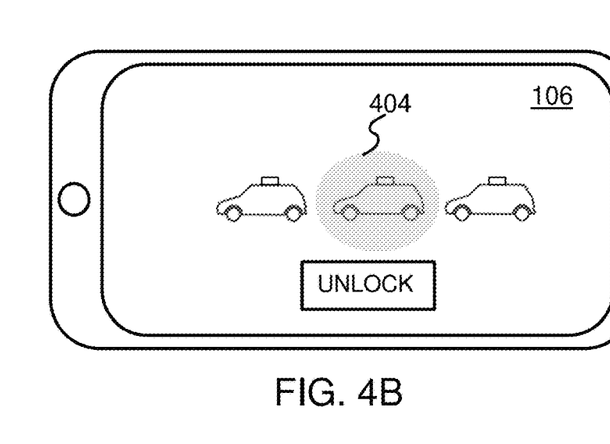
Figure 4C:
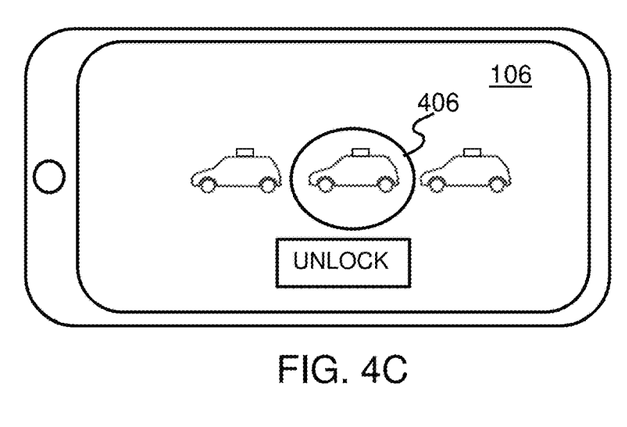
Figure 4D:
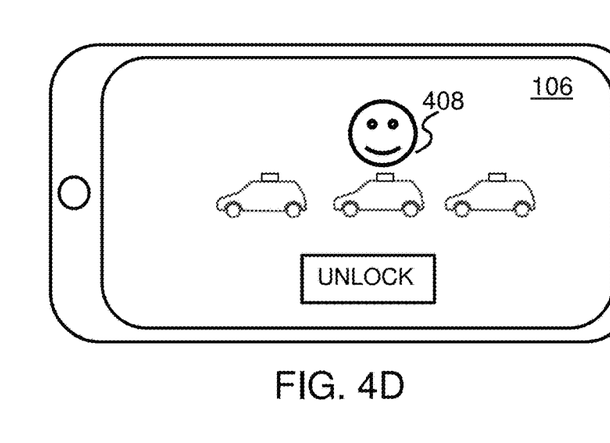

FIGS. 4A-4D illustrate illustrative indications of an autonomous vehicle according to examples of the disclosure. An indication to the intended passenger of the respectively paired autonomous vehicle can be readily customized by the passenger via graphical user interface 106. For example, the indication may be one or more geometric annotation(s) 402, as illustrated in FIG. 4A, such as an arrow accompanied by text stating: "YOUR RIDE." In another example, the indication may be shaded and/or highlighted with color or gray-scale, e.g., color or gray-scale annotation 404, as illustrated in FIG. 4B. In yet another example, the indication may be a geometric annotation 406 such as a circle around the autonomous vehicle, as illustrated in FIG. 4C. FIG. 4D illustrates another example indication of a superimposed image 408 over the autonomous vehicle. Superimposed image 408 can be the intended passenger's face or a cartoon character.

Figure 5:
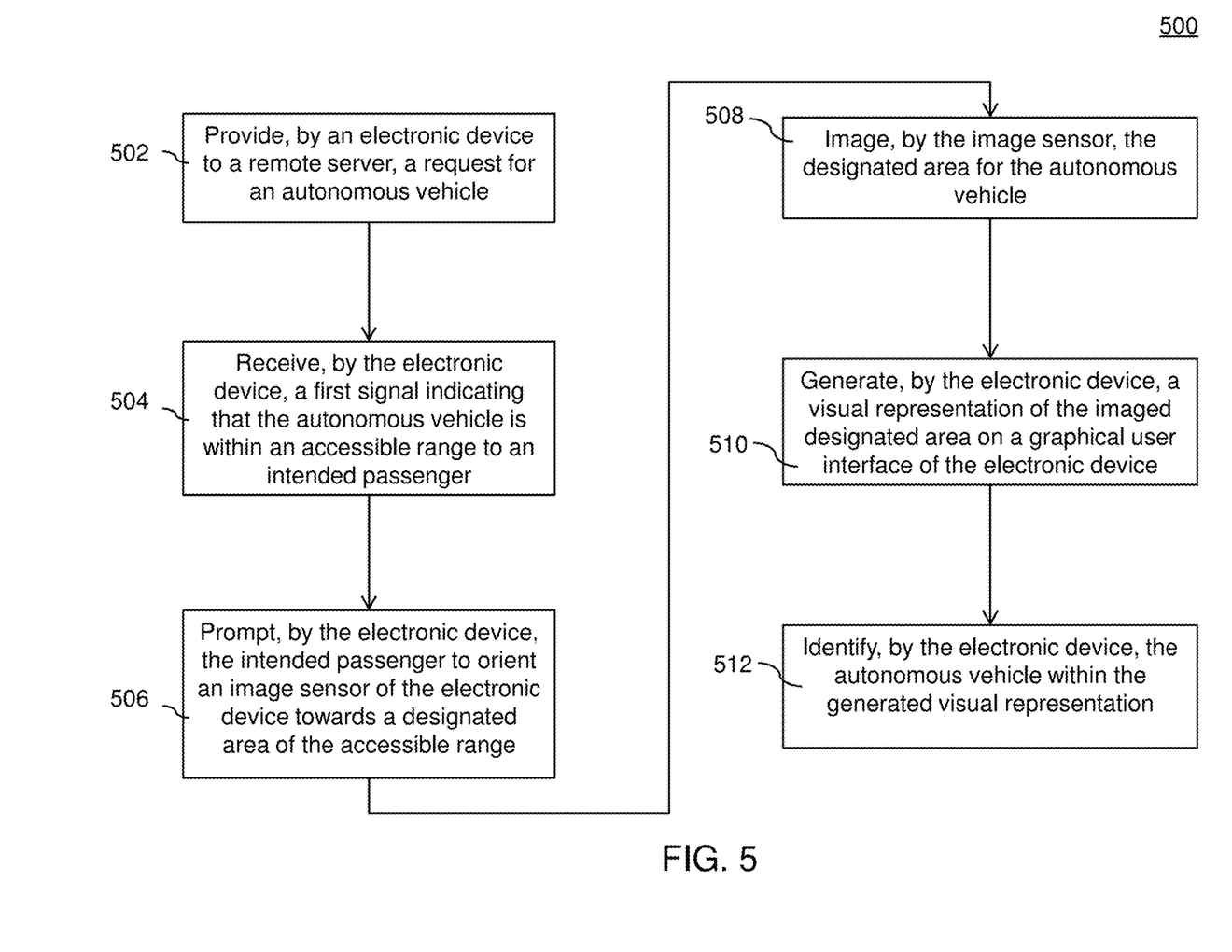
FIG. 5 is a flow chart of an illustrative approach of augmented reality detection for locating a particular autonomous vehicle.

FIG. 5 is a flow chart 500 of an illustrative approach of augmented reality detection for locating a particular autonomous vehicle according to examples of the disclosure. As shown at 502, a request for an autonomous vehicle is provided by electronic device 102 to a remote monitoring backend system 108, for example, via user input into an application installed on electronic device 102. The electronic device 102 may receive, at 504, a first signal indicating that the autonomous vehicle is within an accessible range to an intended passenger. The signal can include a location signal from the autonomous vehicle, which can include, for example, rapidly pulsing exterior vehicle lights at a specified frequency or in a specified pattern intended for detection. The pulses, while of the visible light spectrum, may be pulsating at a frequency too high to be visually perceived as pulsating or flickering by the passenger. The one or more location signals of each autonomous vehicle may also be pulses of nonvisible spectrum light, such as laser light emitted from a LIDAR device affixed to the autonomous vehicle. The one or more location signals of each autonomous vehicle may be made up of a spectrum shift of light colors, e.g., a pulsed pattern involving different wavelengths. Communication using Wi-Fi and/or Bluetooth signals may also be used for communicating additional identification information of the intended one of the vehicles 104 between such vehicle and the electronic device 102, e.g., via text messaging or other suitable messaging. The intended passenger may be prompted, at 506, by electronic device 102 to orient an image sensor 202 towards a designated area of the accessible range. For example, the intended passenger may be prompted by receiving a text message, a phone call, a pop-up notification, a video call, and/or an audible alarm or voice message on electronic device 102. Image sensor 202 images, at 508, the designated area for the autonomous vehicle. For example, the user may be prompted by the electronic device via any suitable audible or graphical message or indication such as previously described to point the electronic device 102 toward a direction that corresponds to the designated area at which the intended vehicle 104*b* is expected, e.g., based on known GPS location information of both the electronic device 102 and the intended vehicle 104*b*, and based on directional (orientation) information known at the electronic device 102 via its inertial sensors and conventional compass functionality. The processing system can process collected location signal data as a function of orientation such as described in the examples above, to determine the orientation of the electronic device that corresponds to the strongest location signal, and can determine that vehicle 104*b* is the source of the location signal and is the intended vehicle 104*b*. At 510, a visual representation of the imaged designated area on the graphical user interface 106 is generated and displayed on the display screen of the electronic device 102. The autonomous vehicle is identified, at 512, by the electronic device 102 within the generated visual representation, e.g., via a suitable graphical indicator such as shown in FIGS. 4A-4D. For example, the indicator may be one or more geometric annotation(s) 402, as illustrated in FIG. 4A, such as an arrow accompanied by text stating: "YOUR RIDE." In another example, the indication may be shaded and/or highlighted with a color, e.g., color annotation 404, as illustrated in FIG. 4B. In yet another example, the indication may be a geometric annotation 406 such as a circle around the autonomous vehicle, as illustrated in FIG. 4C. FIG. 4D illustrates another example indication of a superimposed image 408 over the autonomous vehicle. Superimposed image 408 can be the intended passenger's face or a cartoon character.

The methods and systems described herein may be implemented using any suitable computer processing system with any suitable combination of hardware, software and/or firmware. As shown in FIGS. 1 and 3, entities that control the pool of autonomous vehicles 104 can interact with remote monitoring backend system 106 hosted on one or more computer servers through a wireless and/or wired communication network 110. The computer processing system 112 may execute software operations, program instructions or routines to implement calculations and analyses described above. Such program instructions, accumulated data, and processed data may be stored on one or more non-transitory computer-readable memories 114 and/or one or more data stores for use in databases 116. Communications may be carried out according to a client server architecture whereby passengers and autonomous vehicles 104 may access the remote monitoring backend system 108 via one or more servers via one or more wireless and/or wired communication networks 110.

The systems may include element managers, real-time data buffers, conveyors, file input processors, database indices, data buffers and data managers for managing data and processing. The remote monitoring backend system(s) 108 may also include multiple displays, display interfaces, input/output devices such as keyboards, microphones, mice, touch screens and the like for permitting administrators or support personnel to manage the remote monitoring backend system(s) 108.

This written description describes illustrative embodiments, but other variations fall within the scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. In addition, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply. In addition, as used in the description herein and throughout the claims that follow, the meaning of "about" and/or "approximately" refers to ±10% of the quantity indicated, unless otherwise indicated.

While the disclosed subject matter has been described in terms of illustrative embodiments, it will be understood by those skilled in the art that various modifications can be made thereto without departing from the scope of the claimed subject matter as set forth in the claims.

What is claimed is:

1. A method of augmented reality detection for locating a particular autonomous vehicle, the method comprising:
   providing, by an application executing on an electronic device associated with an intended passenger and to a remote server, a request for an autonomous vehicle;
   receiving, by the application, a first signal indicating that the autonomous vehicle is within an accessible range of the intended passenger;
   prompting, by the application, the passenger to orient an image sensor of the electronic device towards a designated area of the accessible range;
   upon receiving imaging data from the image sensor associated with the designated area for the autonomous vehicle, generating, by the remote server, a visual representation of the imaged designated area for presentation on a graphical user interface of the application executing on the electronic device;
   determining, by the remote server and based on inertial data embedded in the received imaging data, an orientation of the electronic device;
   causing, by the remote server, a second signal to be transmitted from the autonomous vehicle, the second signal being a line of sight signal transmitted by the autonomous vehicle for capture by the image sensor of the electronic device;
   upon receiving an indication that the second signal has been captured by the image sensor of the electronic device, identifying, by the remote server, the autonomous vehicle within the generated visual representation; and
   causing, by the remote server and within the graphical user interface of the application, a presentation of the autonomous vehicle to the identified within the generated visual representation.

2. The method of claim 1, wherein the processing of the second signal includes recording an intensity of the second signal as a function of the scanning to identify a vector between the electronic device and the autonomous vehicle.

3. The method of claim 1, further comprising:
   receiving, by the autonomous vehicle, a global positioning signal from one or more satellites;
   determining, by the autonomous vehicle, a position of the autonomous vehicle within about one meter via one or more of the global positioning signal, high definition maps loaded on the autonomous vehicle, scanned information obtained by the autonomous vehicle, or imaged information obtained by the autonomous vehicle; and
   providing, by the autonomous vehicle, the designated area to the remote server or the application on the electronic device,
   wherein the designated area includes the position and the application on the electronic device causes a display of the high definition maps on the electronic device.

4. The method of claim 1, further comprising:
   selecting, by the remote server, the autonomous vehicle from a pool of autonomous vehicles; and
   providing, by the remote server, the request to the autonomous vehicle.

5. The method according to claim 1, wherein causing the presentation of the autonomous vehicle to be identified within the generated visual representation includes the application causing, on a display of the electronic device, an indication highlighting the autonomous vehicle to be displayed by at least one of superimposing an image on the autonomous vehicle, highlighting the autonomous vehicle with a geometric annotation, and highlighting the autonomous vehicle with a color annotation.

6. The method of claim 1, wherein the designated area includes an obstruction covering at least a portion of the autonomous vehicle.

7. The method of claim 1, wherein the first signal includes a Wi-Fi signal, a Bluetooth signal, or a pulsating laser light.

8. The method of claim 1, further comprising providing access to the autonomous vehicle for the passenger via an access button on the graphical user interface of the application displayed on the electronic device.

9. A system for locating autonomous vehicles, the system comprising:
   a computer processing system; and a computer memory, wherein the computer processing system is configured to execute steps including:
   providing, by an application executing on an electronic device associated with an intended passenger and to a remote server, a request for an autonomous vehicle;
   receiving, by the application, a first signal indicating that the autonomous vehicle is within an accessible range of the intended passenger;
   prompting, by the application, the passenger to orient an image sensor of the electronic device towards a designated area of the accessible range;
   upon receiving imaging data from the image sensor associated with the designated area for the autonomous vehicle, generating, by the electronic device, a visual representation of the imaged designated area on a graphical user interface of the electronic device;
   determining, by the remote server and based on inertial data embedded in the received imaging data, an orientation of the electronic device;
   causing, by the remote server, a second signal to be transmitted from the autonomous vehicle, the second signal being a line of sight signal transmitted by the autonomous vehicle for capture by the image sensor of the electronic device;
   upon receiving an indication that the second signal has been captured by the image sensor of the electronic device, identifying, by the remote server, the autonomous vehicle within the generated visual representation; and
   causing, by the remote server and within the graphical user interface of the application, a presentation of the autonomous vehicle to be identified within the generated visual representation.

10. The system of claim 9, wherein the processing the second signal includes recording an intensity of the second signal as a function of the scanning to identify a vector between the electronic device and the autonomous vehicle.

11. The system of claim 9, further comprising:
    receiving, by the autonomous vehicle, a global positioning signal from one or more satellites;
    determining, by the autonomous vehicle, a position of the autonomous vehicle within about one meter via one or more of the global positioning signal, high definition maps loaded on the autonomous vehicle, scanned information obtained by the autonomous vehicle, or imaged information obtained by the autonomous vehicle; and
    providing, by the autonomous vehicle, the designated area to the remote server or the application on the electronic device, wherein the designated area includes the position and the application on the electronic device causes a display of the high definition maps on the electronic device.

12. The system of claim 9, further comprising:
selecting, by the remote server, the autonomous vehicle from a pool of autonomous vehicles; and
providing, by the remote server, the request to the autonomous vehicle.

13. The system according to claim 9, wherein causing the presentation of the autonomous vehicle to be identified within the generated visual representation includes the application causing, on a display of the electronic device, an indication highlighting the autonomous vehicle to be displayed by at least one of superimposing an image on the autonomous vehicle, highlighting the autonomous vehicle with a geometric annotation, or highlighting the autonomous vehicle with a color annotation.

14. The system of claim 9, wherein the designated area includes an obstruction covering at least a portion of the autonomous vehicle.

15. The system of claim 9, wherein the first signal includes a WiFi signal, a Bluetooth signal, or a pulsating laser light.

16. The system of claim 9, further comprising providing access to the autonomous vehicle for the passenger via an access button on the graphical user interface of the application displayed on the electronic device.

17. A non-transitory computer readable medium comprising:
program instructions for locating autonomous vehicles, the program instructions when executed causing a computer processing system to execute steps including:
providing, by an application executing on an electronic device associated with an intended passenger and to a remote server, a request for an autonomous vehicle;
receiving, by the application, a first signal indicating that the autonomous vehicle is within an accessible range of the intended passenger;
prompting, by the application, the passenger to orient an image sensor of the electronic device towards a designated area of the accessible range;
upon receiving imaging data from the image sensor associated with the designated area for the autonomous vehicle, generating, by the remote server, a visual representation of the imaged designated area for presentation on a graphical user interface of the application executing on the electronic device;
determining, by the remote server and based on inertial data embedded in the received imaging data, an orientation of the electronic device;
causing, by the remote server, a second signal to be transmitted from the autonomous vehicle, the second signal being a line of sight signal transmitted by the autonomous vehicle for capture by the image sensor of the electronic device;
upon receiving an indication that the second signal has been captured by the image sensor of the electronic device, identifying, by the remote server, the autonomous vehicle within the generated visual representation; and
causing, by the remote server and within the graphical user interface of the application, a presentation of the autonomous vehicle to be identified within the generated visual representation.

18. The non-transitory computer readable medium of claim 17, wherein the steps further include providing access to the autonomous vehicle for the passenger via an access button on the graphical user interface of the application displayed on the electronic device.

* * * * *